(12) United States Patent
Jones et al.

(10) Patent No.: US 7,785,018 B2
(45) Date of Patent: Aug. 31, 2010

(54) FIBER OPTIC ADAPTERS WITH INTEGRATED SHUTTER

(75) Inventors: Ashley W. Jones, Denton, TX (US);
Daniel Leyva, Jr., Arlington, TX (US);
Michael de Jong, Colleyville, TX (US);
Peter T. Travis, Milton, VT (US)

(73) Assignee: Corning Cable Systems LLC, Hickory, NC (US)

( * ) Notice: Subject to any disclaimer, the term of this patent is extended or adjusted under 35 U.S.C. 154(b) by 197 days.

(21) Appl. No.: 12/231,144

(22) Filed: Aug. 29, 2008

(65) Prior Publication Data

US 2010/0054665 A1 Mar. 4, 2010

(51) Int. Cl.
*G02B 6/38* (2006.01)
*G02B 6/36* (2006.01)

(52) U.S. Cl. .............................. 385/73; 385/58; 385/59; 385/70; 385/75; 385/94

(58) Field of Classification Search ............. 385/53–94, 385/134–139; 439/135–150
See application file for complete search history.

(56) References Cited

U.S. PATENT DOCUMENTS

| | | | |
|---|---|---|---|
| 4,687,291 A | 8/1987 | Stape et al. ............. | 350/96.21 |
| 5,348,487 A | 9/1994 | Marazzi et al. ............ | 439/138 |
| 5,363,460 A | 11/1994 | Marazzi et al. ............. | 385/70 |
| 5,506,922 A | 4/1996 | Grois et al. ................... | 385/75 |
| 5,883,995 A | 3/1999 | Lu ............................... | 385/60 |
| 5,915,059 A * | 6/1999 | Takahashi et al. ........... | 385/128 |
| 6,004,043 A | 12/1999 | Abendschein et al. ........ | 385/76 |
| 6,081,647 A | 6/2000 | Roth et al. .................. | 385/139 |
| 6,108,482 A | 8/2000 | Roth .......................... | 385/139 |
| 6,142,676 A | 11/2000 | Lu .............................. | 385/60 |
| 6,206,577 B1 | 3/2001 | Hall, III et al. ............... | 385/53 |
| 6,302,592 B1 | 10/2001 | Züllig ........................ | 385/60 |
| 6,352,375 B1 | 3/2002 | Shimoji et al. ................ | 385/92 |
| 6,595,696 B1 | 7/2003 | Zellak .......................... | 385/72 |
| 6,685,362 B2 | 2/2004 | Burkholder et al. ........... | 385/78 |
| 6,688,780 B2 | 2/2004 | Duran ......................... | 385/76 |
| 6,715,930 B2 * | 4/2004 | McBride ....................... | 385/73 |
| 6,789,950 B1 | 9/2004 | Loder et al. ................... | 385/53 |
| 6,866,424 B2 * | 3/2005 | Tanaka et al. ................. | 385/55 |
| 7,534,115 B2 * | 5/2009 | Murano et al. .............. | 439/138 |

* cited by examiner

*Primary Examiner*—Daniel Petkovsek

(57) ABSTRACT

The present disclosure is generally directed to a fiber optic adapter assembly for mating fiber optic connectors. The fiber optic adapter includes a body, an alignment cap, and a shutter door. The alignment cap and the body together define a space with the shutter door pivotally disposed in the space for inhibiting debris from entering through the opening and into the body. The shutter door is configured to pivot inwardly when contacted by a fiber optic connector being inserted through the at least one opening and into the body. Additionally, the shutter door includes at least one standoff and at least one latch, wherein the latch is configured to engage and assist in retaining a fiber optic connector that is inserted into the fiber optic adapter assembly.

22 Claims, 15 Drawing Sheets

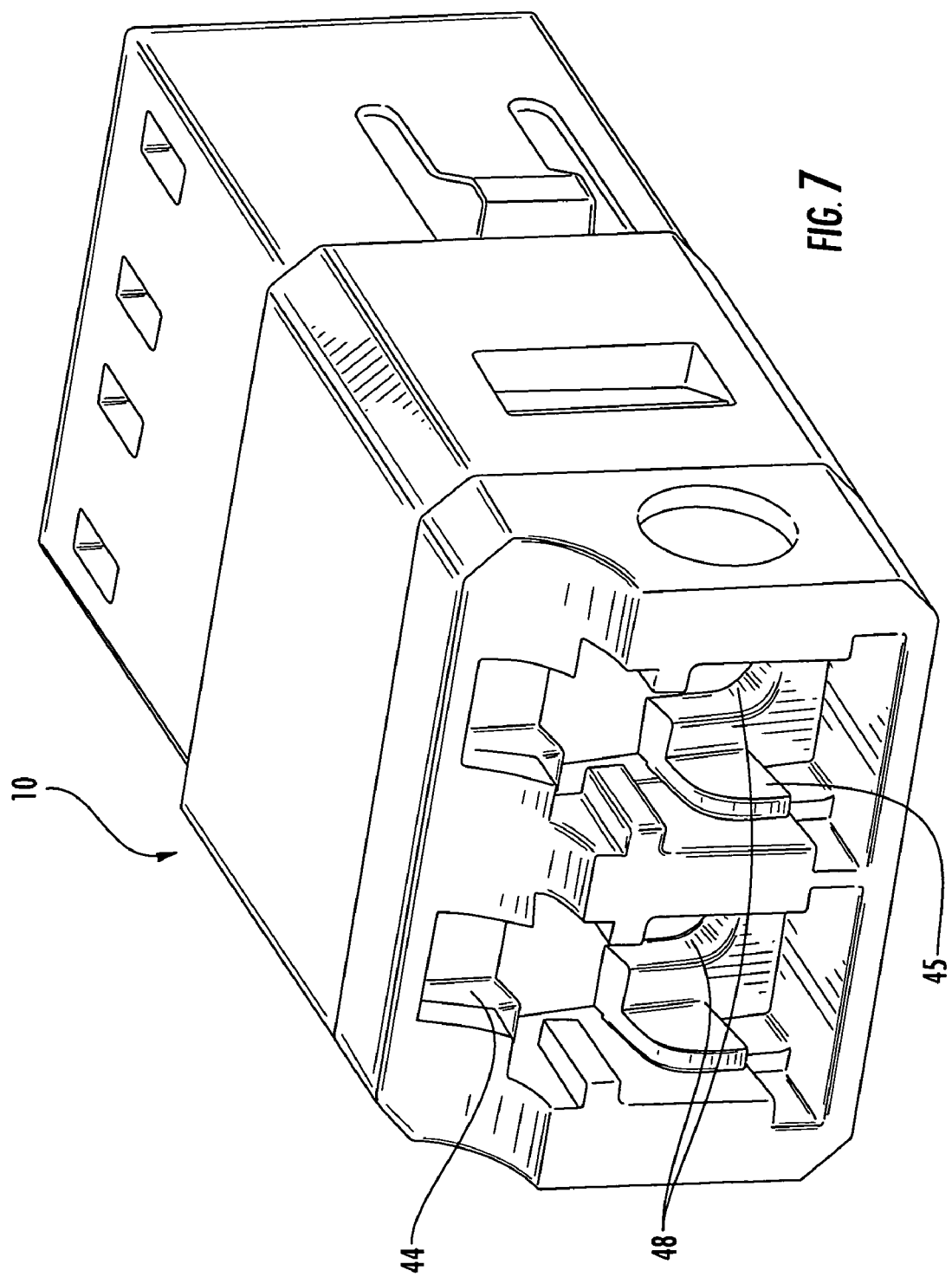

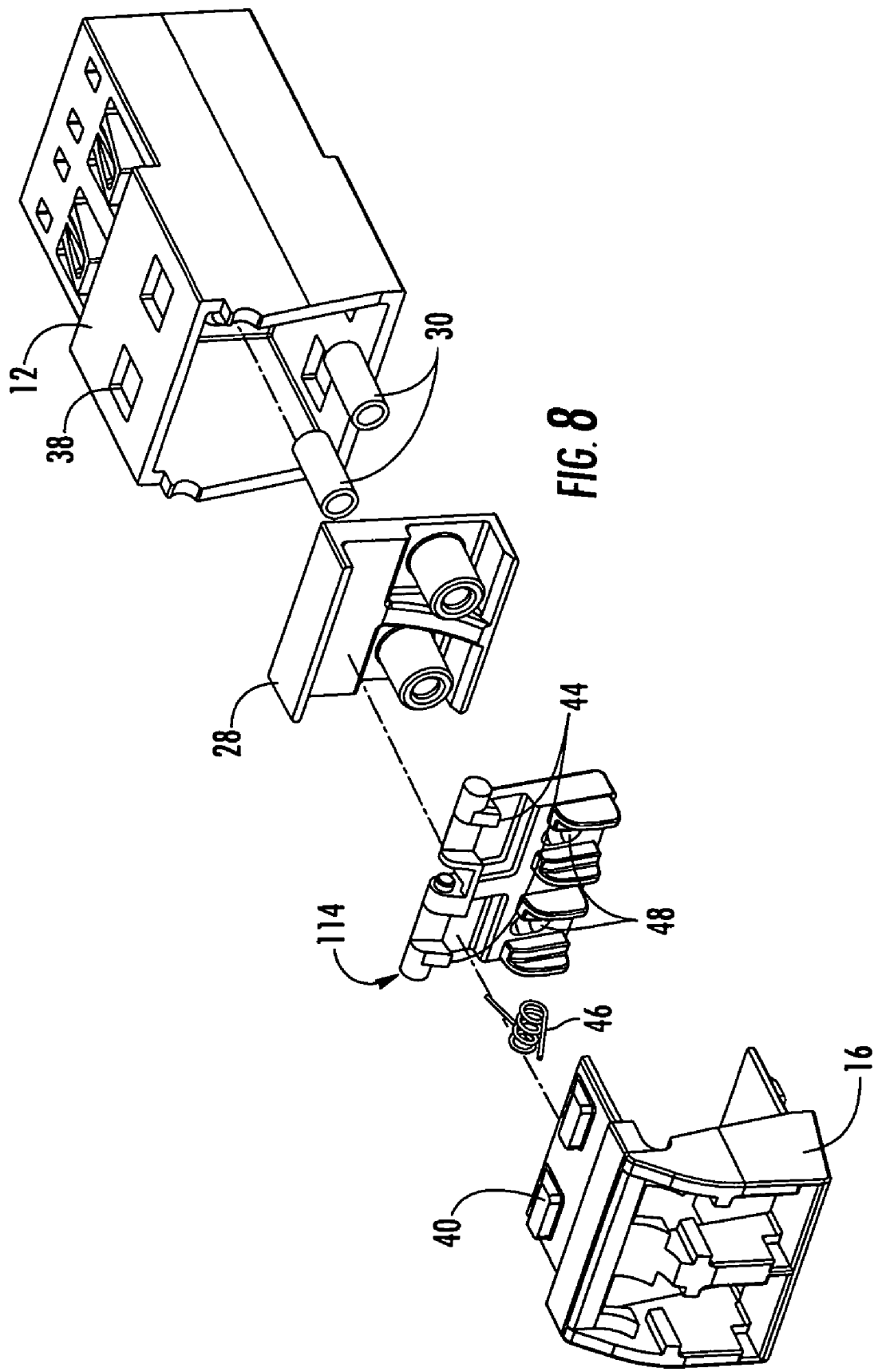

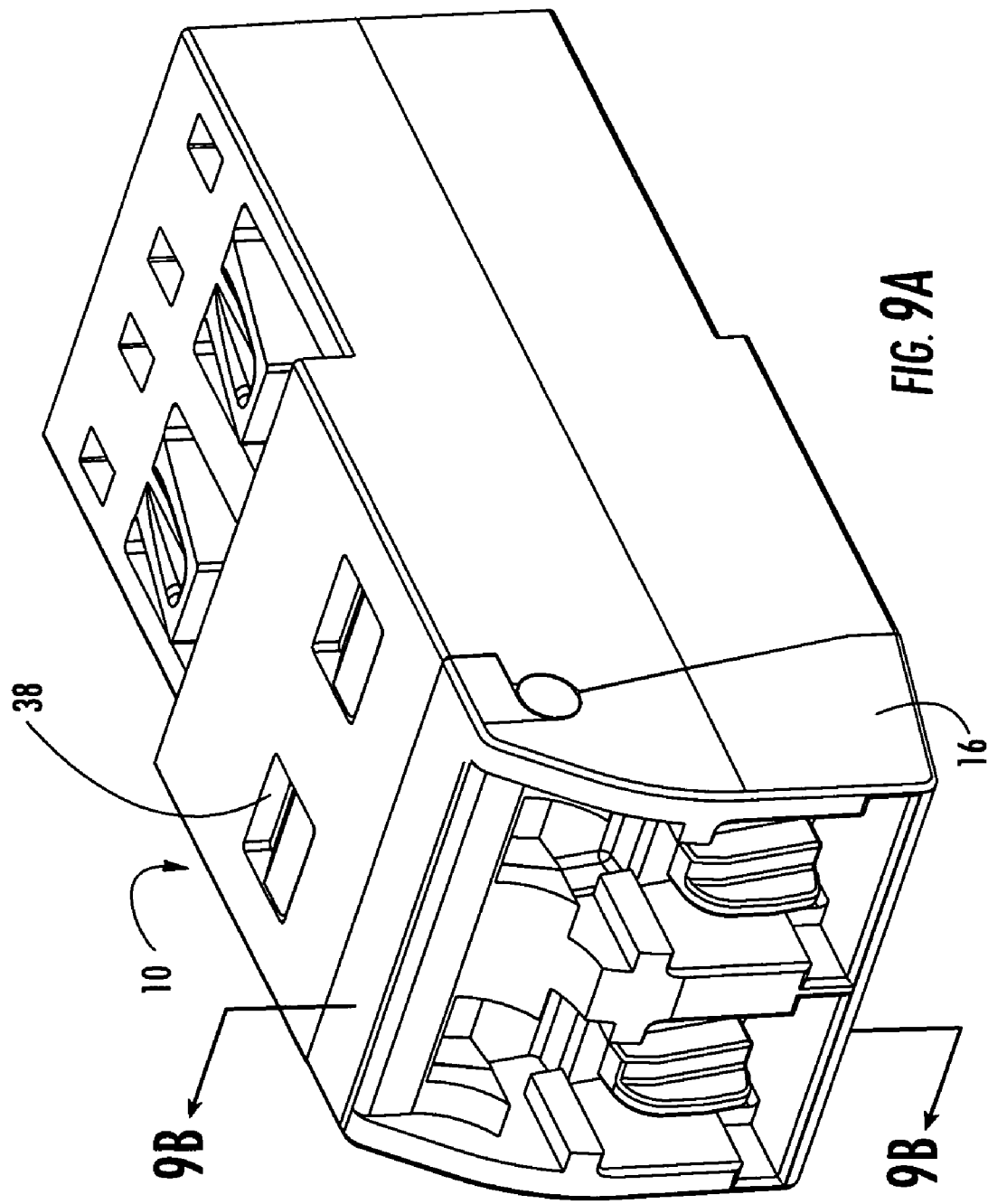

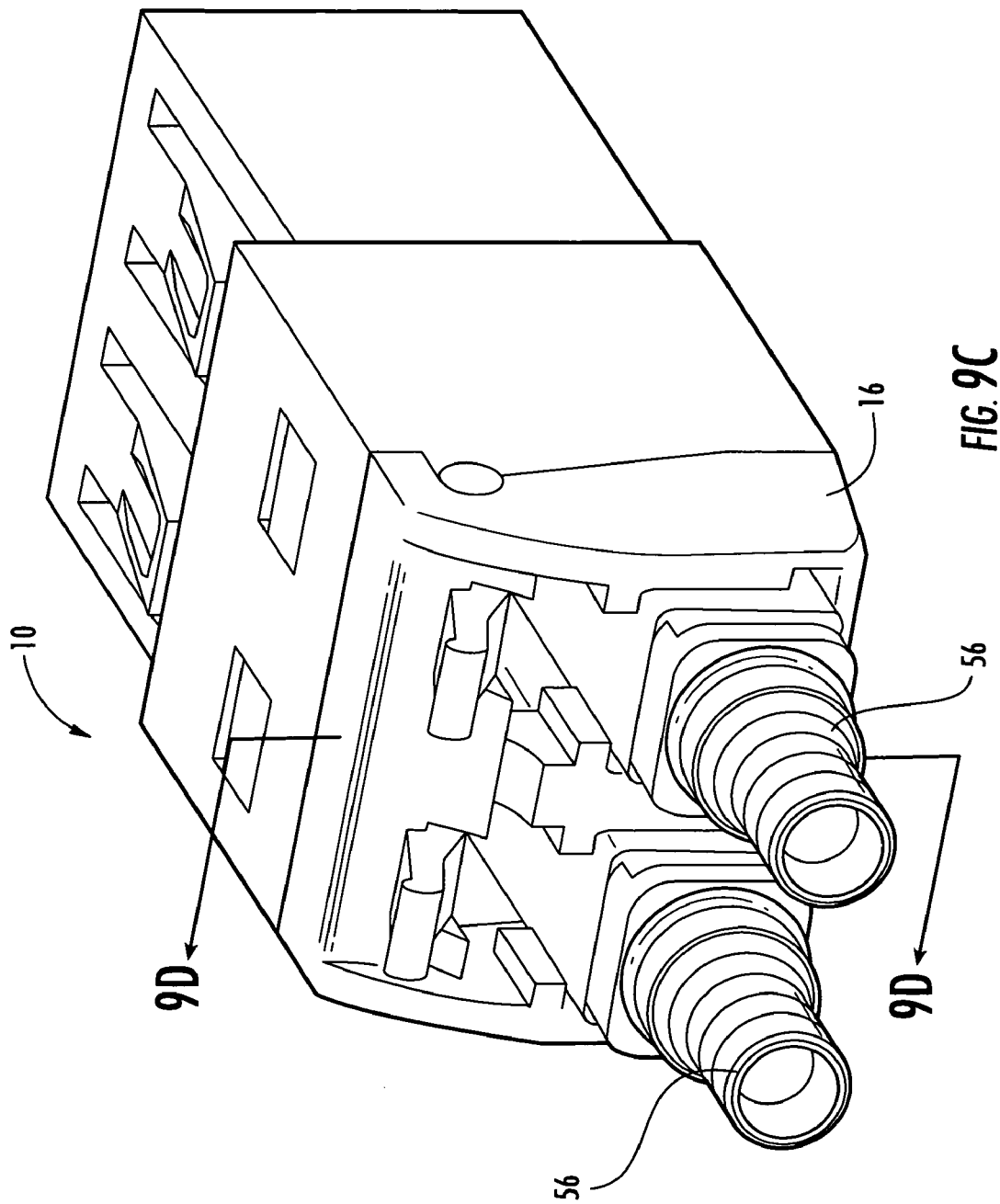

FIBER OPTIC ADAPTERS WITH INTEGRATED SHUTTER

FIELD OF THE INVENTION

The present invention relates generally to fiber optic connectors and adapters, and more specifically to simplified fiber optic assemblies and having shutter mechanisms.

BACKGROUND OF THE INVENTION

In many applications, it is desirable to connect and disconnect fiber optic cables from different sources. Fiber optic cables can be coaxially aligned and optically coupled using fiber optic connectors and fiber optic adapters. Fiber optic adapters have a pair of openings, one at each end of the adapter, each of the openings configured to receive a corresponding fiber optic connector and provide alignment for the fiber optic connectors during mating. Typically, the adapters are fixed to a dividing member, such as a planar surface, or the like.

For environmental and safety reasons, it can also be desirable to employ shutters with fiber optic adapters. Shutters serve the dual purpose of inhibiting dust or other debris from infiltrating the adapters, similar to a dust cap, and providing eye protection from the connected light source. Many existing shutter solutions require that more than one shutter door be initially opened prior to the fiber optic connector installation. This can be cumbersome for the operator/installer. Thus, a need exists in the art for an improved adapter that utilizes a single internally opening shutter door per adapter opening, with the shutter door being opened in the same operation as the fiber optic connector installation. A further need in the art is an improved adapter that utilizes an internally opening shutter door that can retain a fiber optic connector within an adapter, without significantly and undesirably increasing the overall dimensions of the adapter. Increases in the dimensions of an adapter can negatively impact the density of grouped adapters. Still another need in the art is an improved adapter that utilizes an internally opening shutter door that does not permit a fiber optic connector ferrule to contact a surface of the shutter door and cause dust or other debris to enter the fiber optic connector.

SUMMARY OF THE INVENTION

The present disclosure is generally directed to an adapter assembly, the adapter assembly including a body, an alignment cap, and a shutter door. At least a portion of the alignment cap is in contact with a portion of the body, the alignment cap defining at least one opening configured to receive a fiber optic connector through the at least one opening into the body, the alignment cap and the body together defining a space. The shutter door is pivotally disposed in the space defined by the body and the alignment cap in order to inhibit debris from entering through the at least one opening into the body. The shutter door is configured to pivot inwardly when contacted by a fiber optic connector being inserted through the at least one opening into the body. The shutter door includes at least one standoff and at least one latch, the at least one standoff configured to assist in inhibiting a ferrule of a fiber optic connector from contacting the shutter door, the at least one latch configured to engage and assist in retaining a fiber optic connector that is inserted through the at least one opening into the body.

In another embodiment of the present disclosure, an adapter assembly is described, the adapter assembly including a body, an alignment cap, and a shutter door. The body includes a first end and a second end and the shutter door includes a translucent material. At least a portion of the alignment cap is in contact with a portion of the first end of body, the alignment cap defining at least one opening configured to receive a fiber optic connector through the at least one opening into the first end of the body, the alignment cap and the first end of the body together defining a space. The shutter door is pivotally disposed in the space defined by the first end of the body and the alignment cap in order to inhibit debris from entering through the at least one opening into the first end of the body. The shutter door is configured to pivot inwardly when contacted by a fiber optic connector being inserted through the at least one opening into the first end of the body. The shutter door includes at least one standoff and at least one latch, the at least one standoff configured to assist in inhibiting a ferrule of a fiber optic connector from contacting the shutter door, the at least one latch configured to engage and assist in retaining a fiber optic connector that is inserted through the at least one opening into the first end of the body.

In still another embodiment of the present disclosure, a fiber optic connector and adapter system including a fiber optic connector and an adapter is described.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operation of the invention.

BRIEF DESCRIPTION OF THE DRAWINGS

FIG. 7 is an assembled perspective view of the fiber optic adapter of FIG. 6;

FIG. 8 is a partially exploded view of a fiber optic adapter according to certain aspects of the present invention;

FIG. 9A is an assembled perspective view of the fiber optic adapter of FIG. 8;

FIG. 9C is a perspective view of the fiber optic adapter of FIG. 9A with two fiber optic connectors retained therein according to certain aspects of the present invention;

DETAILED DESCRIPTION OF THE INVENTION

Figure 1:
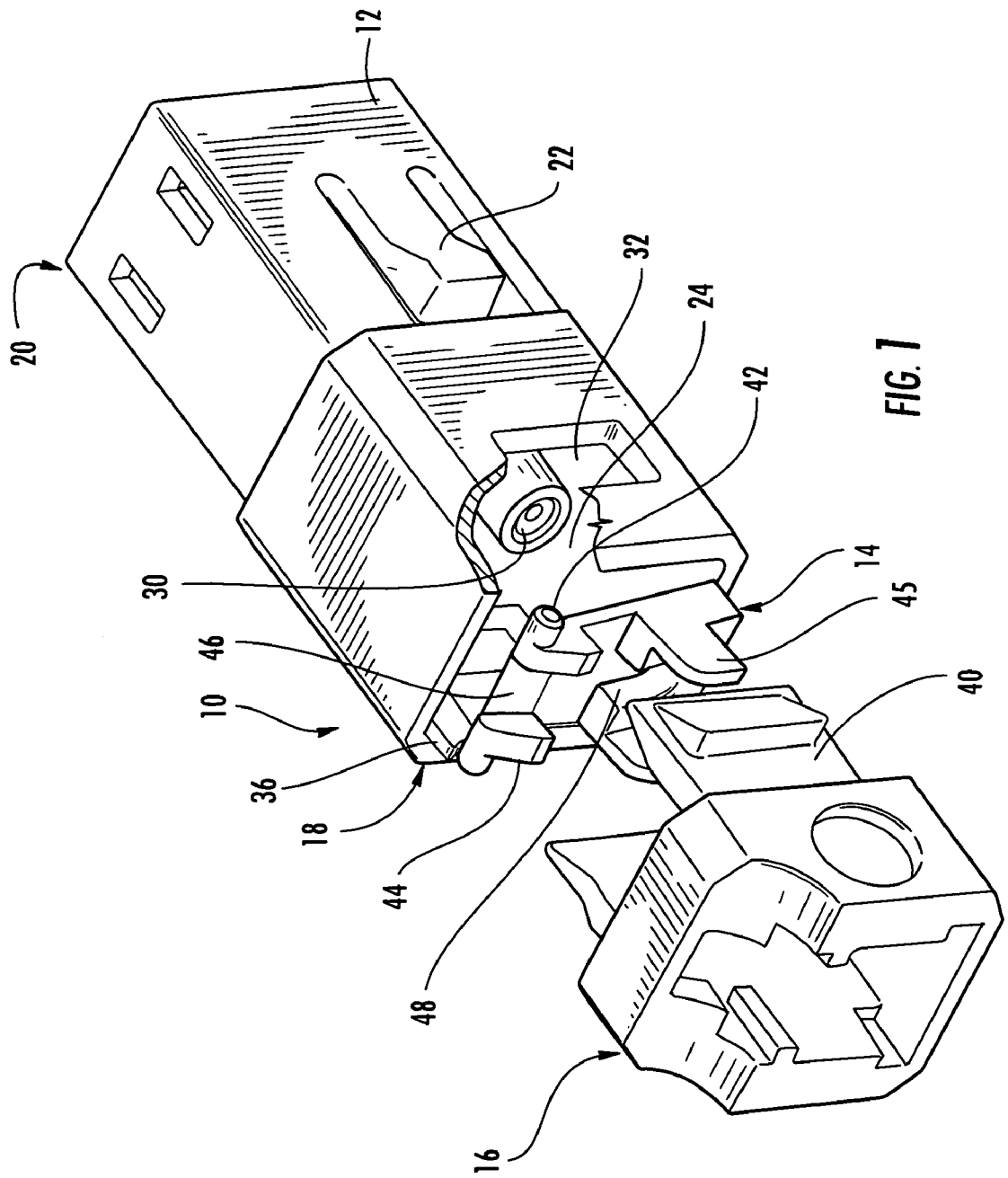
FIG. 1 is a partially exploded and a partial cutaway view of a fiber optic adapter according to certain aspects of the present invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

Examples of fiber optic adapters according to various aspects of the present invention are disclosed in the figures, as described below. The various disclosed aspects of the embodiments below may be combined or modified to create further embodiments of the invention.

In various embodiments, the present invention provides a simplified shuttered fiber optic adapter assembly which includes an internally pivoting shutter door at one or more adapter openings that, when actuated, can act as a latch for engaging and securing a fiber optic connector that is inserted therein. The present disclosure describes an adapter assembly in which only a single shutter door is required per adapter opening. Conventional designs often utilize more than one shutter door per opening. This results in increased component costs, increased labor requirements, and decreased efficiencies. The single shutter door described herein addresses such concerns. In addition, the motion of the shutter door is initiated by the insertion of a fiber optic connector into the adapter assembly. The shutter door is advantageously configured so that the ferrule of a fiber optic connector does not make contact with the shutter door when inserted coincident with the longitudinal axis of the intended adapter passageway, thus avoiding contamination and/or damage of the ferrule. The latching mechanism of the shutter door retains the fiber optic connector within the adapter, without significantly and undesirably increasing the overall dimensions of the adapter.

The adapters shown herein define opposing openings for mating fiber optic connectors, one or more from the back side of the adapter and one or more from the front side. In other words, a first fiber optic connector can be received in a cavity of an adapter body (i.e., through a first opening at the back side) and a second fiber optic connector can be received in an opening of an alignment cap and into a cavity of the adapter body (i.e., through a second opening at the front side), thereby aligning and mating the fiber optic connectors. Advantageously, the design and construction of exemplary embodiments of a shutter are such that the shutter can be located proximate to either or both ends of an adapter at one or more openings. Moreover, the adapters described herein can be configured to accept a variety of fiber optic connector types, such as but not limited to SC, LC, MT-RJ, MTP, MPO and other like single or multi-fiber ferrules now known or hereafter developed.

Figure 2:
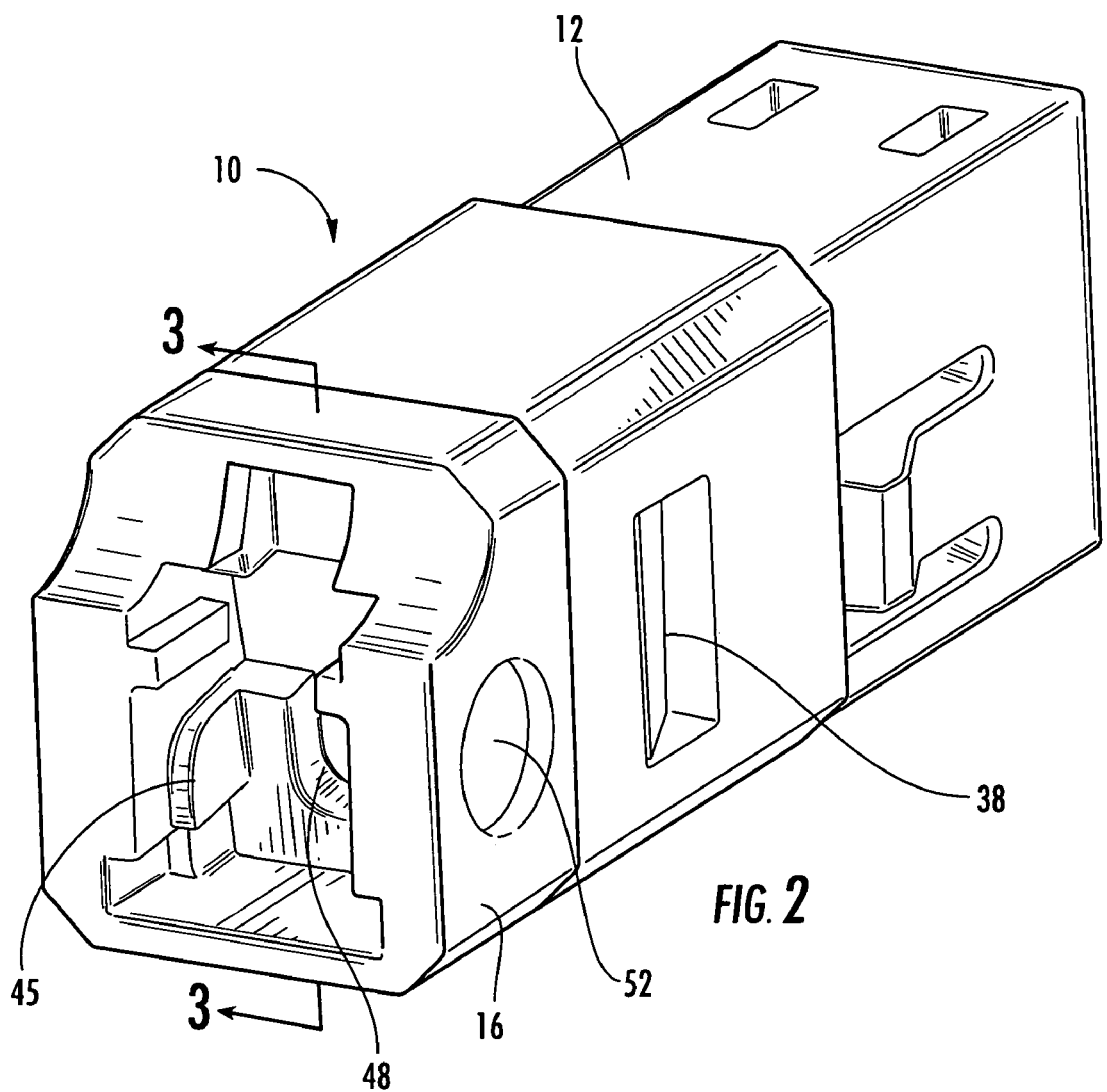
FIG. 2 is an assembled perspective view of the fiber optic adapter of FIG. 1.
Figure 3:
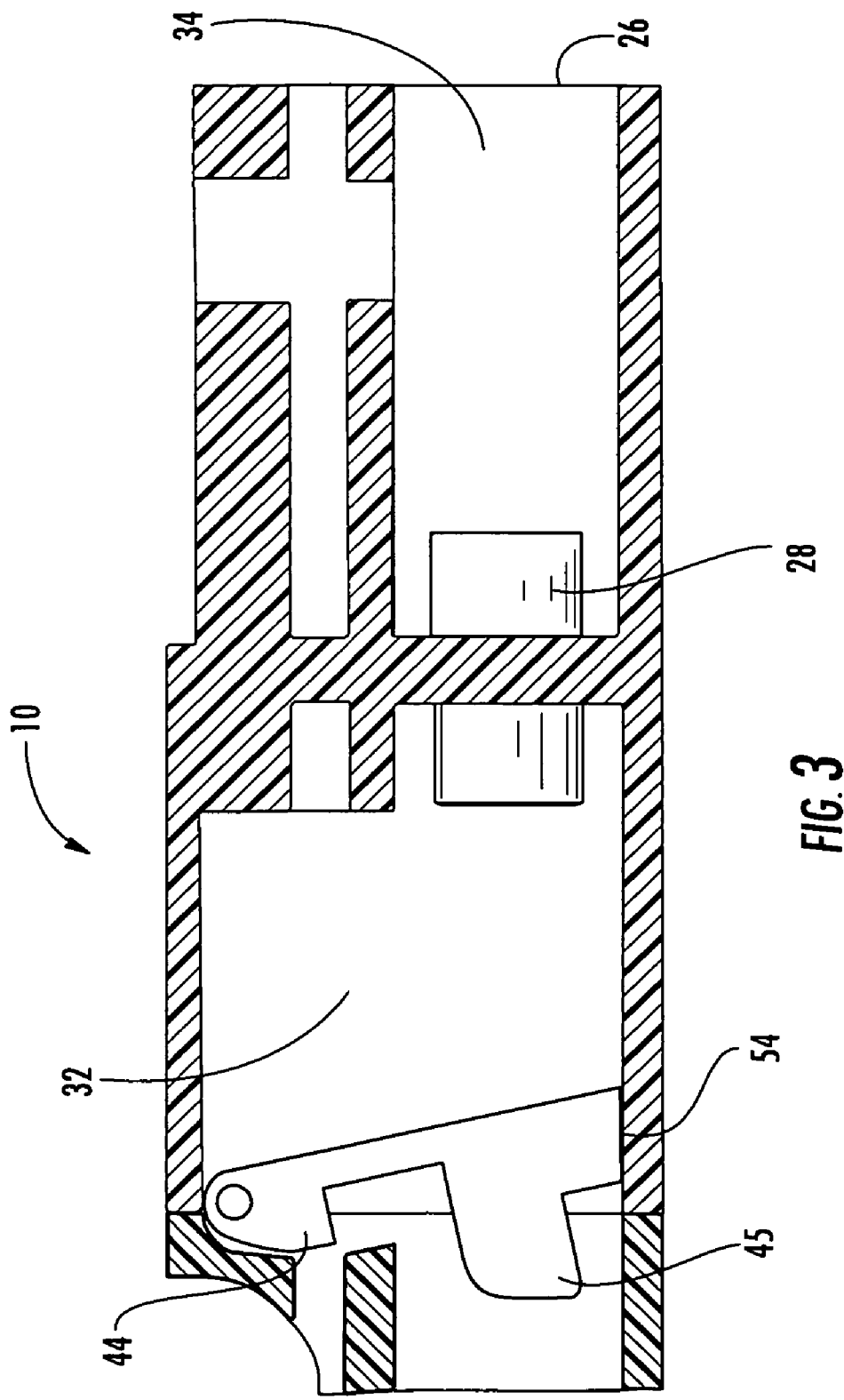
FIG. 3 is a partial cross-sectional view of the fiber optic adapter of FIG. 2 taken along line 3-3.

Turning to FIGS. 1-3, a first explanatory embodiment of a fiber optic adapter 10 including certain features of the present invention is illustrated. Fiber optic adapter 10 includes a body 12, a shutter door 14, and an alignment cap 16. Body 12 has a first end 18 and a second end 20. The first end 18 of body 12 defines a first opening 24 into first cavity 32 and the second end 20 of body 12 defines a second opening 26 into second cavity 34.

As best shown in FIG. 3, positioned between the two cavities 32, 34 of body 12 is a sleeve bore 28 configured for receiving a ferrule alignment sleeve 30 (FIG. 1) therein. Ferrule alignment sleeve 30 may be formed from any suitable material such a ceramic, a non-ceramic material, or other suitable material. Generally speaking, sleeve bore 28 and alignment sleeve 30 are axially aligned along a longitudinal axis of body 12 for receiving a portion of the ferrules of the respective fiber optic connectors during mating.

Body 12 also includes one or more retention tabs 22 which can be used for mounting fiber optic adapter 10 in a dividing member, panel, or the like such as an adapter panel (not illustrated). In other words, retention tabs 22 allow the craft to mount the fiber optic adapter by snap fitting the same into an aperture of a wall, panel, dividing member, or the like. Body 12 further includes one or more hinge supports 36 for pivotally mounting shutter 14 between body 12 and alignment cap 16. Body 12 also defines one or more slots 38 (FIG. 2) for receiving and retaining one or more tabs 40 of alignment cap 16, thereby securing the alignment cap 16 to body 12 with shutter 14 pivotally mounted therebetween.

Shutter door 14 includes hinges 42 that are configured for pivotally mounting shutter 14 to pivot inwardly when contacted by a fiber optic connector. As shown, hinges 42 are integrally formed on opposite sides of shutter door 14, but other embodiments can use a separate component for the hinge. Body 12, as well as shutter door 14 should be of suitable size and shape to permit shutter door 14 to pivot inwardly so as to provide sliding surface clearances and mating sealing surfaces. Additionally, hinges 42 of shutter door 14 can be held in place on hinge supports 36 by alignment cap 16, but other suitable mounting structures are possible for pivotally mounting shutter door 14. The shutter door 14 is configured for inhibiting debris from entering opening 24 and cavity 32 when shutter door 14 is in the closed position. Additionally, shutter door 14 provides a safety feature for the craft when it is closed by inhibiting transmitted optical signals from exiting the fiber optic adapter. Embodiments may also include a spring 46 for biasing shutter door 14 to a closed position when a fiber optic connector is not inserted therein. Spring 46 can have any suitable design such as a torsion spring or the like having a suitable spring constant as known in the art.

Figure 5:
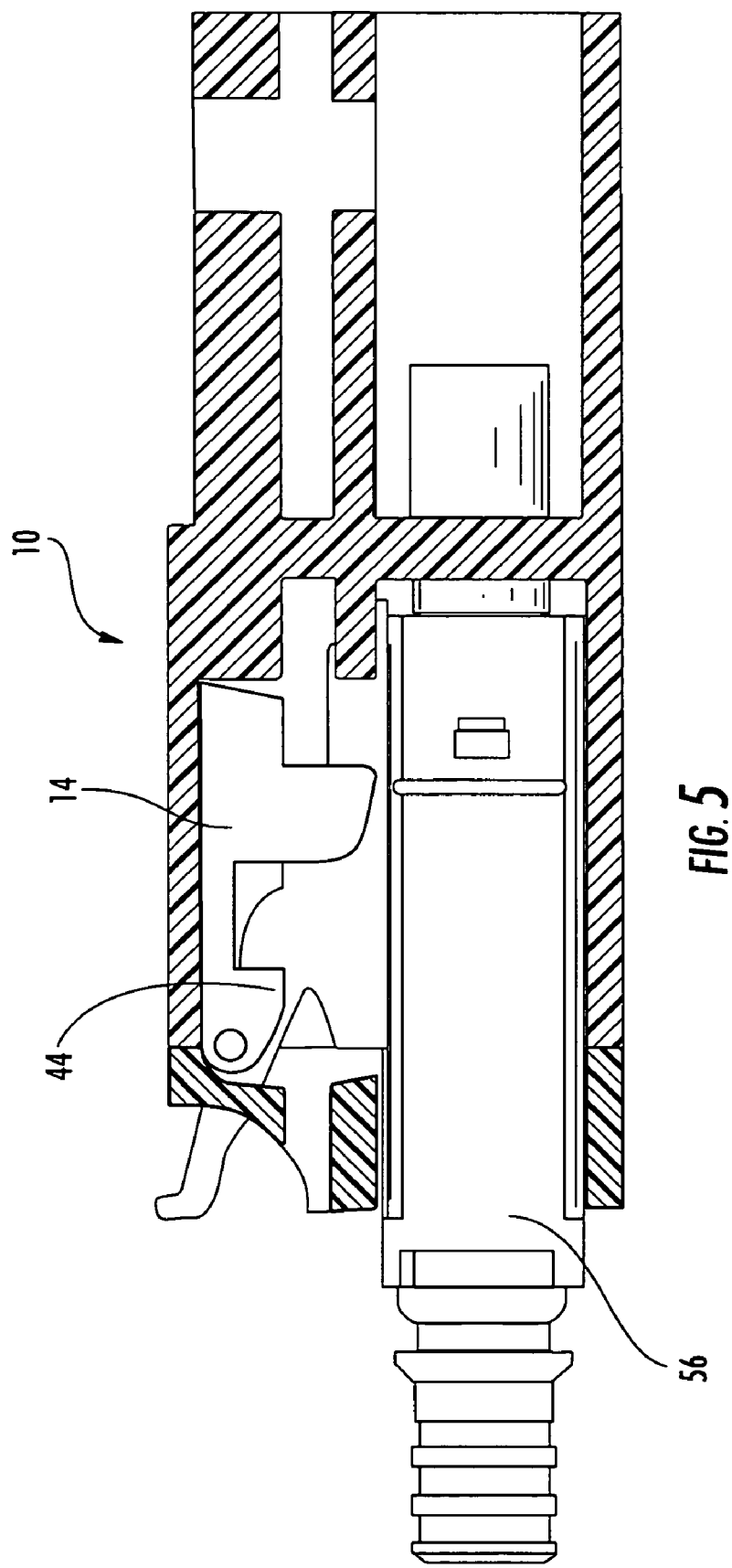
FIG. 5 is a partial cross-sectional view of the fiber optic adapter of FIG. 4 taken along line 5-5.

Shutter door 14 also includes one or more latches 44 for engaging and assisting in retaining a fiber optic connector when fully inserted into fiber optic adapter 10. In other words, shutter door 14 of the present invention also acts as a latch mechanism for the fiber optic connector that is inserted into the adapter assembly on the shutter door side. Latches 44 can have any suitable shape and preferably are configured to mate with corresponding geometry of a standard fiber optic connector. As best shown in FIG. 5, latches 44 have a locking backstop surface (i.e., the flat horizontal surface on latch 44 in FIG. 1) so that when the fiber optic connector is inserted the predetermined distance the trigger (not numbered) of the fiber optic connector engages latches 44 for securing the same.

Shutter door 14 further includes one or more standoffs 45 extending in the outward direction. The geometry and orientation of the shutter door 14, and specifically the one or more standoffs 45, are such that a ferrule of a fiber optic connector is inhibited from making contact with the shutter door 14 when a fiber optic connector is utilized to open shutter door 14 along a substantially coincident axis with the passage, thus avoiding contamination and/or damage of the ferrule. In this regard, standoffs 45 can protrude from shutter door 14 so as to make contact with the housing of a fiber optic connector rather than the ferrule. As described previously, shutter door 14 may be biased to a closed position using one or more springs. Moreover, due to the biasing of the shutter door 14 to the closed position even when open, standoffs 45 can further assist with pressure against a fiber optic connector and/or aid latches 44 in inhibiting movement of a fiber optic connector that is fully inserted in opening 24. Standoffs 45 can make contact with the top portion of a fiber optic connector when it is fully inserted through opening 24, and standoffs 45 can inhibit the shutter door 14 from pivoting until the fiber optic connector is withdrawn. Also, a fiber optic connector should be able to withstand a certain pull force, and latches 44 in combination with standoffs 45, can assist in maintaining a fiber optic connector connected within the adapter assembly, even under a pull force.

In addition, shutter door 14 can define a recessed area 48 to further assist inhibiting a ferrule of a fiber optic connector from contacting shutter door 14. The recessed area 48 can be shaped to correspond to the size and shape of a ferrule. In other words, the shape of recessed area 48 (i.e., length, width, and/or depth) may vary based on the intended fiber optic connector. Shutter door 14 can have other suitable configurations within the concepts of the invention such as discussed below.

In further embodiments, shutter door 14 can be formed from an optically clear or semi-translucent material capable of viewing light emanating therethrough. In such embodiments, the material should be sufficiently translucent to provide a visual indication of light, such as glowing. The material can diffuse light away from the optical axis to avoid damage to an operator's eye. The internal structural geometry of the shutter door 14 can include angled or curved surfaces, facets or lenses to reflect the light away from the optical axis and diffuse it radially outwardly. The internal structural geometry of the shutter door 14 can also function to reflect or diffuse a light source of sufficient power, such as that from a visual fault locator (VFL). A visual indication of light is provided and diffused light is capable of being detected through the translucent shutter door 14 so that it is not necessary to remove the shutter door 14 to detect the light, and it is also not necessary to remove the back side fiber optic connector from the adapter to detect light.

In addition, materials can be utilized to convert transmission light to visible light. Such materials can include inorganic materials comprising elements of erbium (Er) and halogens or compounds thereof, among other infrared-to-visible wavelength upconversion materials. Preferred materials can include coatings or additives added to the shutter door 14 for molding and have sensitivity for infrared light. Halogens can include chlorine, bromine and iodine and can include elements of yttrium, lead, potassium, barium, sodium, silver and cesium exclusive of the oxides thereof. The emission property of rare earth ions in a solid are dependent on the concentration of rare earth ions themselves and on the matrix surrounding the rare earth ions. The matrix may or may not contain oxygen. Other materials capable of converting infrared to visible light are contemplated without departing from the scope of the invention, for example, films used to produce IR detection cards, films, and wands available from several companies including Edmunds Optics, Newport, Sumita, Entek, Kodak, NewFocus, Applied Scintillation Technologies and Lumitek. Light sources for connector identification include those capable of emitting visible and invisible light. Shutter door 14 material can be tailored to attenuate certain wavelengths and enhance the visibility of others. The shutter doors 14 are also preferably molded using a material that is relatively hard and does not shrink significantly following the molding process, such that the resulting dimensions of the shutter door 14 can be precisely and consistently defined.

Alignment cap 16 includes an opening configured to receive a fiber optic connector. The alignment cap can optionally include a marking location 52 for indicating the fiber optic connector being mated with the adapter 10 (i.e. A, B, C, etc). Body 12 defines one or more slots 38 for receiving one or more tabs 40 of alignment cap 16 so that alignment cap 16 can be secured (i.e., snap-fitted) to body 12. As shown in FIG. 3, alignment cap 16 and body 12 together define space 54 in which the shutter door 14 is disposed. Referring again to FIG. 2, alignment cap 16 is configured to allow standoffs 45 to project from shutter door 14, so that the fiber optic connector can push open shutter door as the fiber optic connector is inserted into the adapter assembly. Alignment cap 16 is of suitable size and shape so that shutter door 14 can fit between alignment cap 16 and body 12.

Unless otherwise specified herein, the components of the fiber optic adapter 10 described herein can be formed from injection molded plastic, or the like, and no ultrasonic welding or the like is required to assemble the adapter 10. Thus, the alignment cap 16, shutter door 14, and body 12 have sizes and shapes that can complement each other to provide for a secure fit. However, adhesives or other materials can be utilized to join various components together, if desired.

Figure 4:
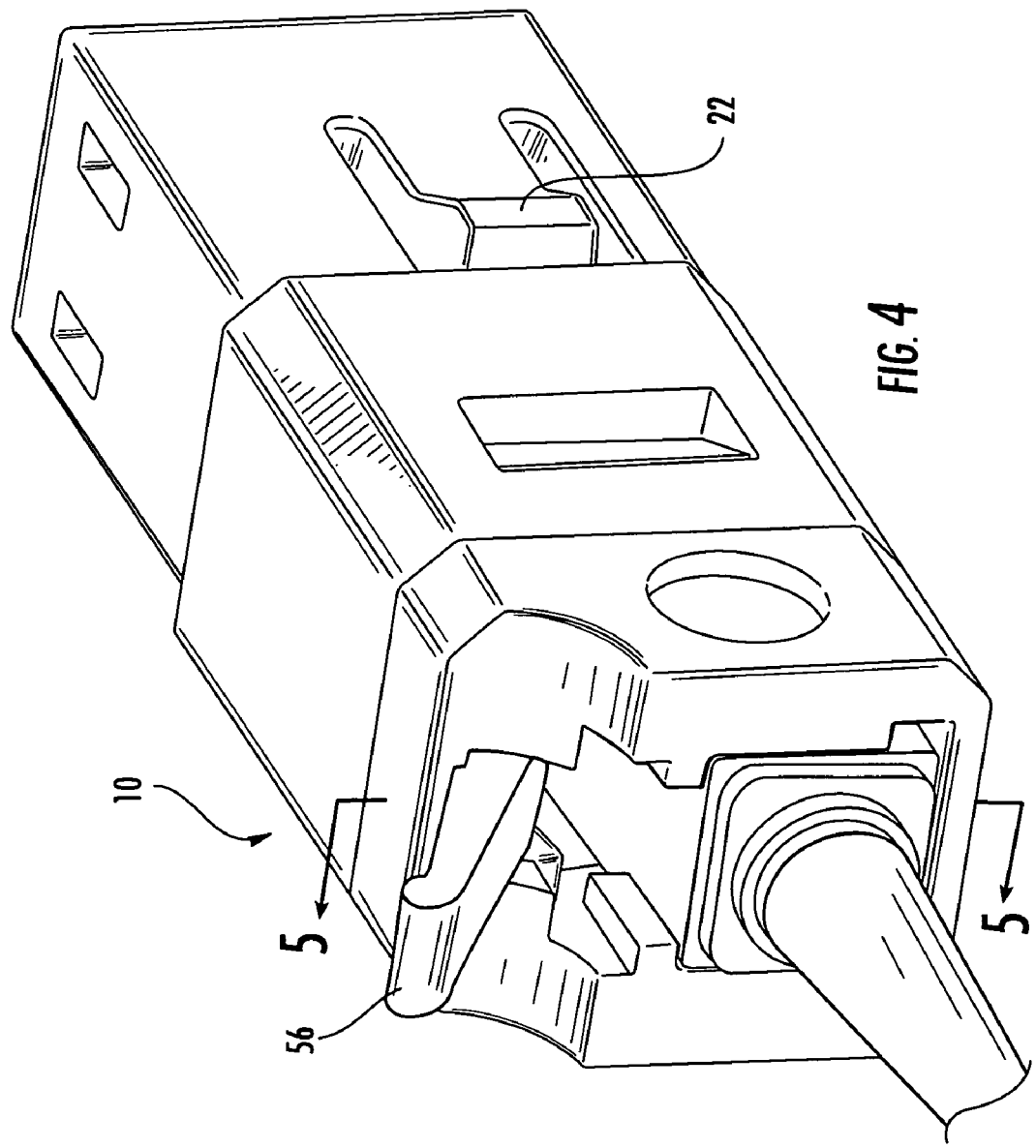
FIG. 4 is a perspective view of the fiber optic adapter of FIG. 1 with a fiber optic connector retained therein according to certain aspects of the present invention.

Turning to FIGS. 4 and 5, adapter assembly 10 is shown populated with a fiber optic connector 56. An optical fiber is terminated within fiber optic connector 56 and loaded into adapter 10 for exemplary purposes only, and designs can vary to accommodate other common fiber optic connectors. In an exemplary embodiment, the adapter 10 can be disposed with a patch panel such that the fiber optic connector 56 is pre-installed into the back side of the adapter 10 ready for interconnection with a front side installed fiber optic connector, such as a fiber optic jumper assembly. As shown in FIG. 5, the latches 44 of shutter door 14 engage and secure the fiber optic connector 56 within adapter assembly 10. Moreover, fiber optic connector 56 is released by pushing down on the latching trigger (not numbered) and pulling to remove the same in a conventional fashion. Adapters assemblies can be secured into a patch panel using retention tabs 22 or any other suitable method. For example, referring to FIG. 10A, a duplex adapter having a metal clip 60 is illustrated for securing the adapter assembly.

Figure 6:
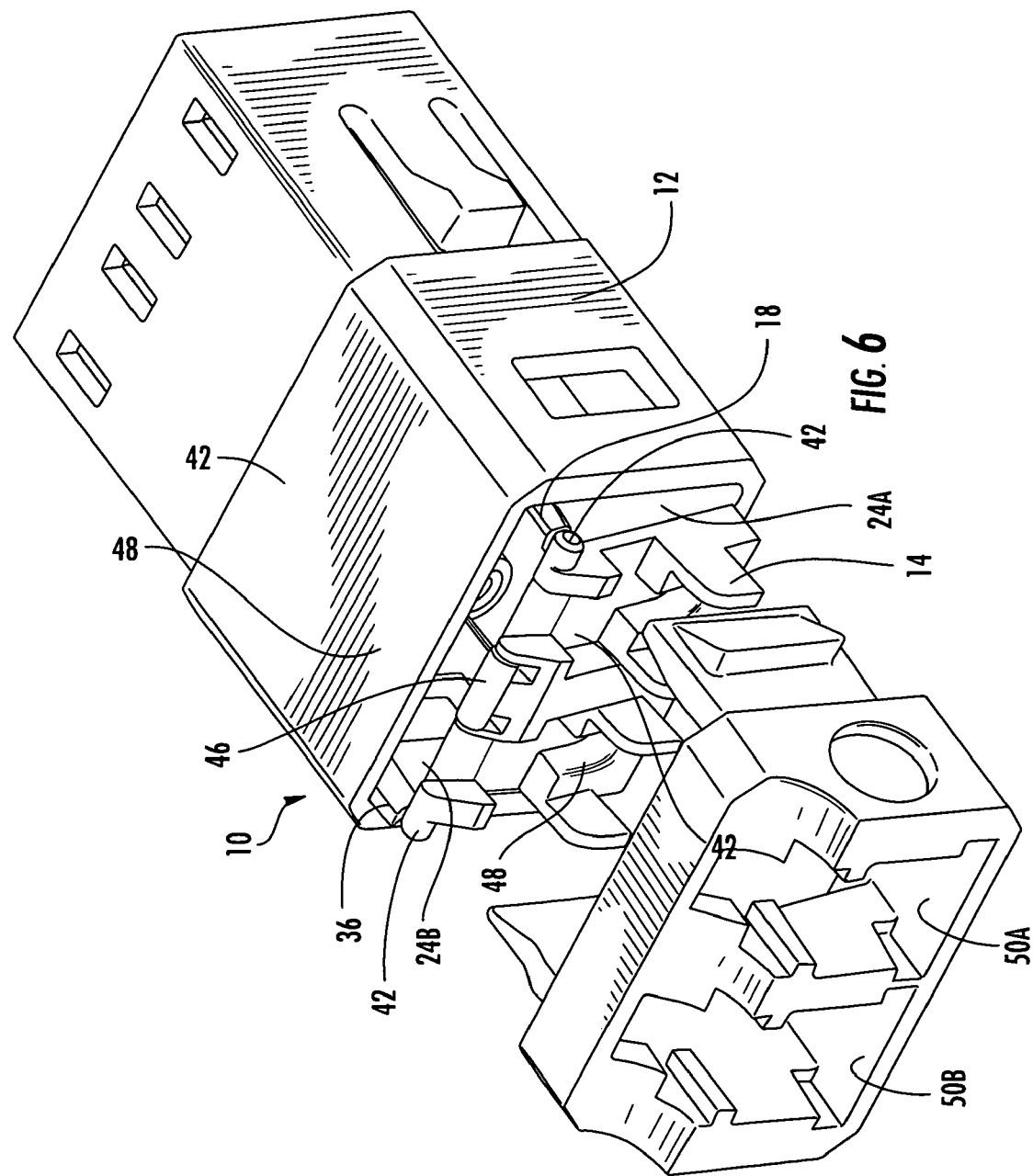
FIG. 6 is a partially exploded view of a fiber optic adapter according to certain aspects of the present invention.

Turning to FIGS. 6-11, various other explanatory embodiments of the present invention are illustrated. For instance, FIGS. 6 and 7 depict a duplex adapter 10 in accordance with certain embodiments of the present disclosure. The duplex adapter 10 operates substantially the same as the single connecter embodiment previously described. The duplex adapter includes a body 12 having two separate openings 24A, 24B for receiving two separate fiber optic connectors into the first end 18. A single shutter door 14 includes hinges 42 that are configured to pivotally mount shutter 14 to pivot inwardly when contacted by the fiber optic connector during insertion. It should be understood that a separate shutter doors at each opening 24A, 24B are also contemplated by the present disclosure. Body 12 should be of suitable size and shape to permit shutter door 14 to pivot inwardly so as to be almost perpendicular to the position of the shutter door 14 when it is not pivoted inwardly. Shutter door hinges 42 can be held in place on hinge supports 36 by alignment cap 16 which also defines two separate openings 50A, 50B. Again, spring 46 can assist in biasing shutter door 14 to a closed position to inhibit debris from entering openings 24A, 24B, as discussed in the previous embodiment.

As before, shutter door 14 also includes one or more latches 44 and one or more standoffs 45. Latches 44 of shutter door 14 can assist in retaining a fiber optic connector that is inserted through openings 50A, 50B of the alignment cap 16. The geometry and orientation of the shutter door 14, and specifically the one or more standoffs 45, are such that a ferrule of a fiber optic connector does not make contact with the shutter door 14 when a fiber optic connector is utilized to open shutter door 14, thus avoiding contamination of the ferrule. Again, standoffs 45 can protrude from shutter door 14 so as to make contact with the housing of a fiber optic connector rather than the sensitive ferrule. Latches 44 can mate with corresponding geometry of a standard fiber optic connector.

Figure 9B:
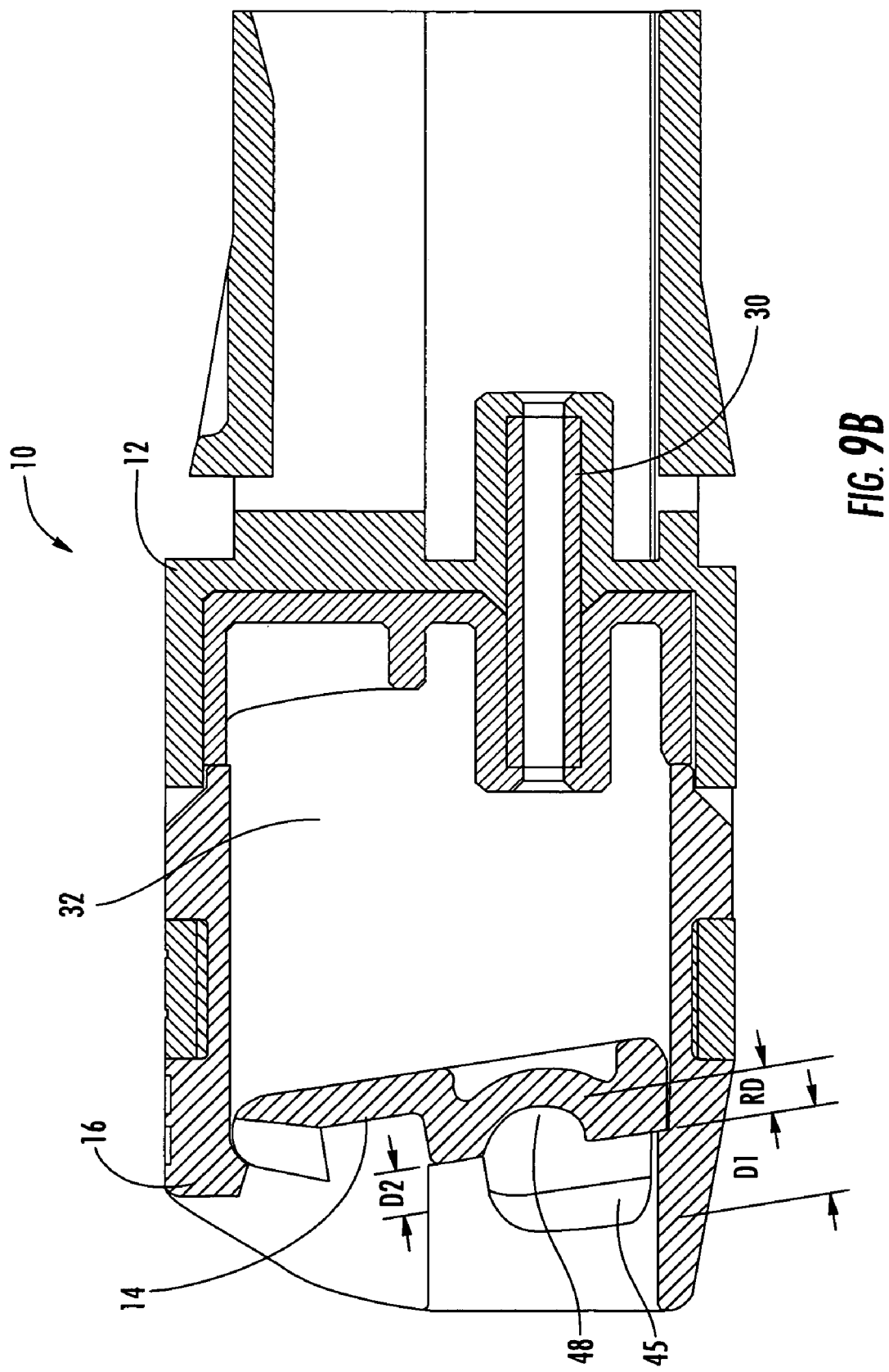
FIG. 9B is a cross-sectional view of the fiber optic adapter of FIG. 9A taken along line 9B-9B.
Figure 9D:
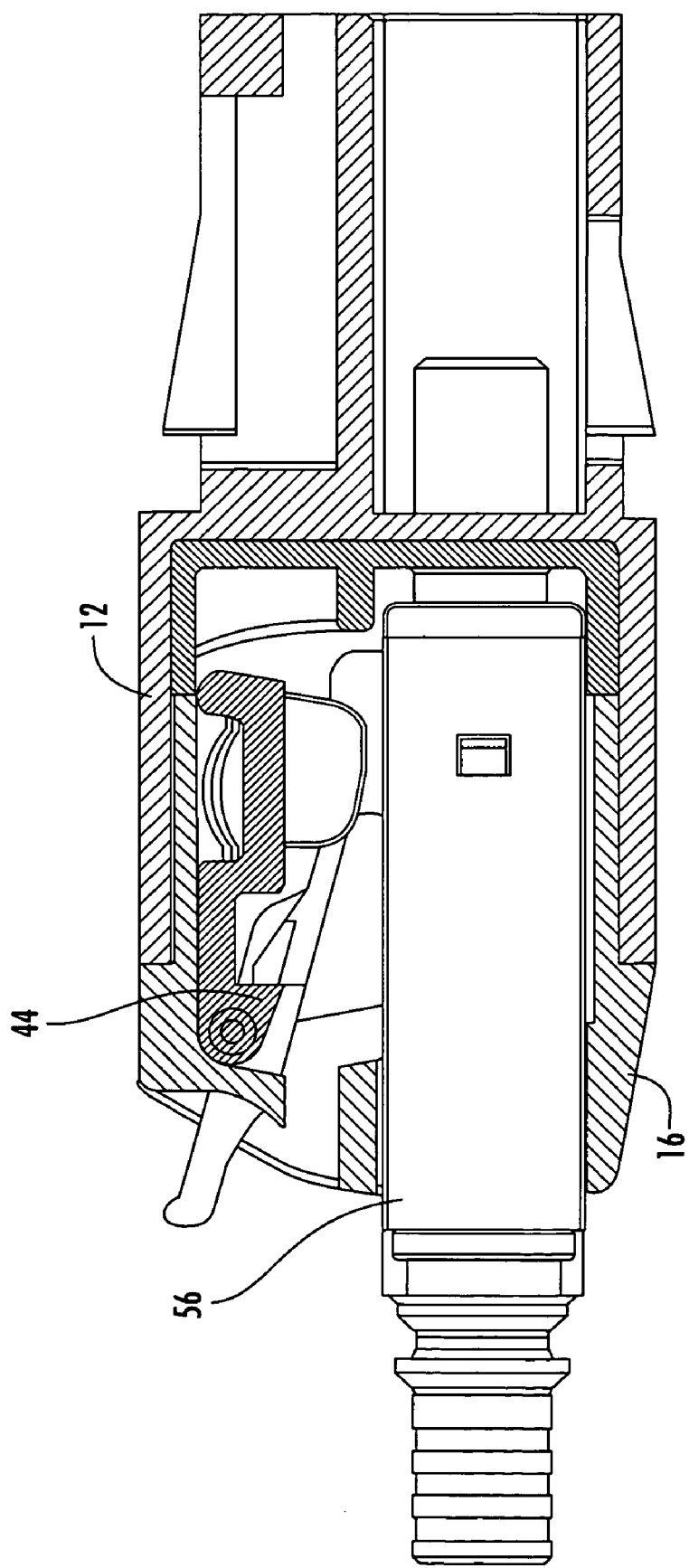
FIG. 9D is a cross-sectional view of the fiber optic adapter of FIG. 9C taken along line 9D-9D.

Referring to FIGS. 8 and 9A-9D, still another duplex adapter 10 is illustrated. As with the previously described duplex adapter, the operation is substantially the same as the single connecter embodiment previously described. However, tabs 40 of alignment cap 16 extend from the top and bottom of alignment cap 16 rather than the sides. Consequently, slots 38 of body 12 are also positioned in the top and bottom of body 12 rather than the sides. In this manner, multiple fiber optic adapters can be ganged together as would be understood by one skilled in the art. In addition, sleeve bore 28 partially receives ferrule alignment sleeves 30 as illustrated in FIG. 9D. Manufacturing sleeve bore 28 as a separate component may improve manufacturing efficiencies in certain embodiments.

As best shown in FIG. 9B, shutter door 114 of duplex adapter 10 has a different configuration than shutter door 14. Specifically, standoffs 45 of shutter door 114 have a stepped profile. The outer step has a depth of D1 from the planar surface of shutter door 114 and the inner step has a depth D2 from the planar surface of shutter door 114. Additionally, recessed area 48 has an arcuate shape with a recessed depth RD for inhibiting the ferrule from contacting shutter door 114. In other words, it is the total distance of recessed depth RD plus inner step depth D2 that allows for the clearance between the ferrule endface and the shutter door 114; rather, than just solely the depth of the standoffs from the planar surface of the shutter door. Consequently, standoffs 45 can advantageously have a shorter depth, which permits a compact footprint for the assembly. Referring to FIGS. 9C and 9D, adapter 10 is shown populated with two fiber optic connectors 56. As with shutter door 14, shutter door 114 includes latches 44 for engaging and securing the fiber optic connector 56. Latches 44 can mate with corresponding geometry of a trigger of a standard fiber optic connector when fiber optic connector 56 is fully inserted and inhibit fiber optic connector 56 from being withdrawn until the trigger is depressed to release the latches 44.

Figure 10A:
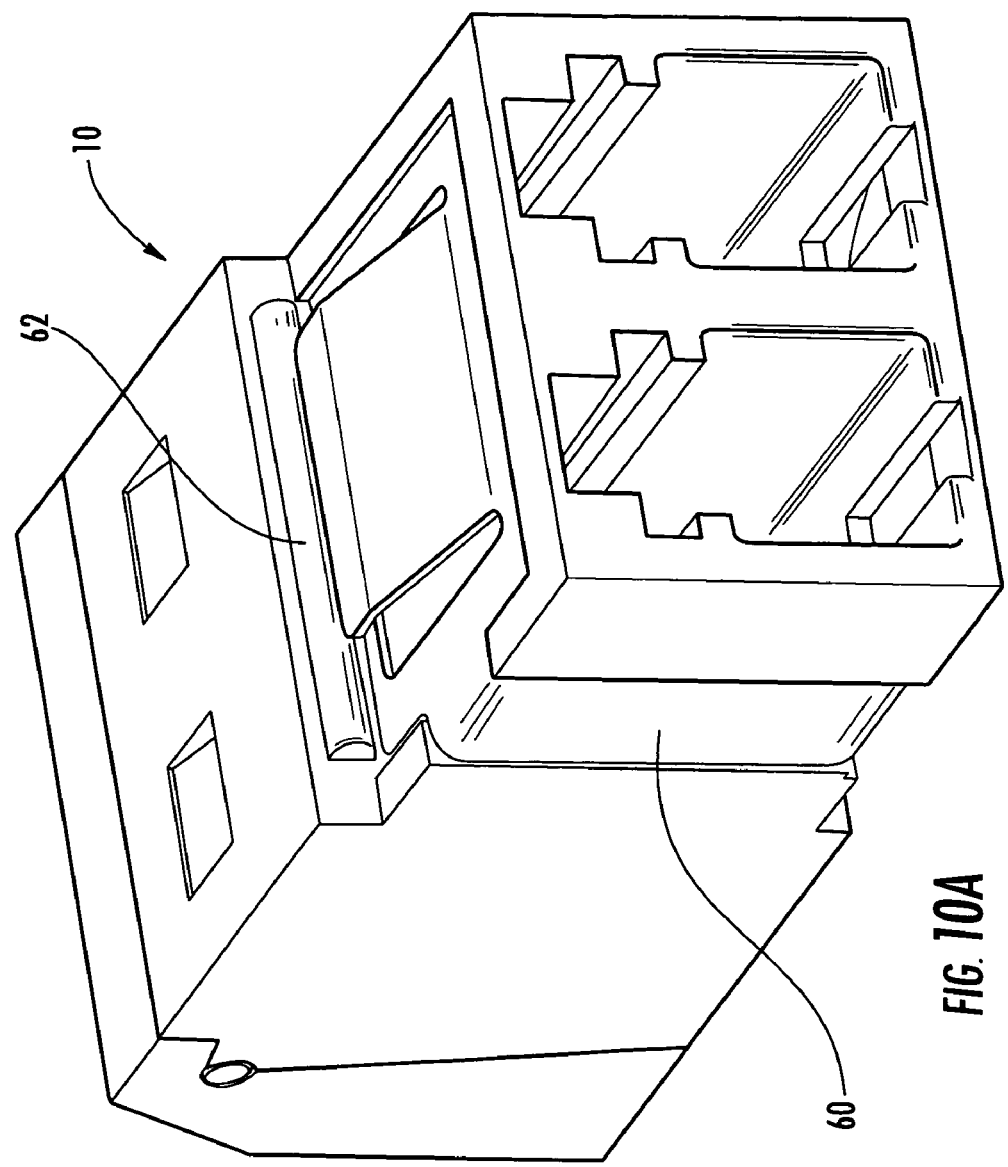
FIGS. 10A and 10B are perspective views of other embodiments of fiber optic adapters.
Figure 10B:
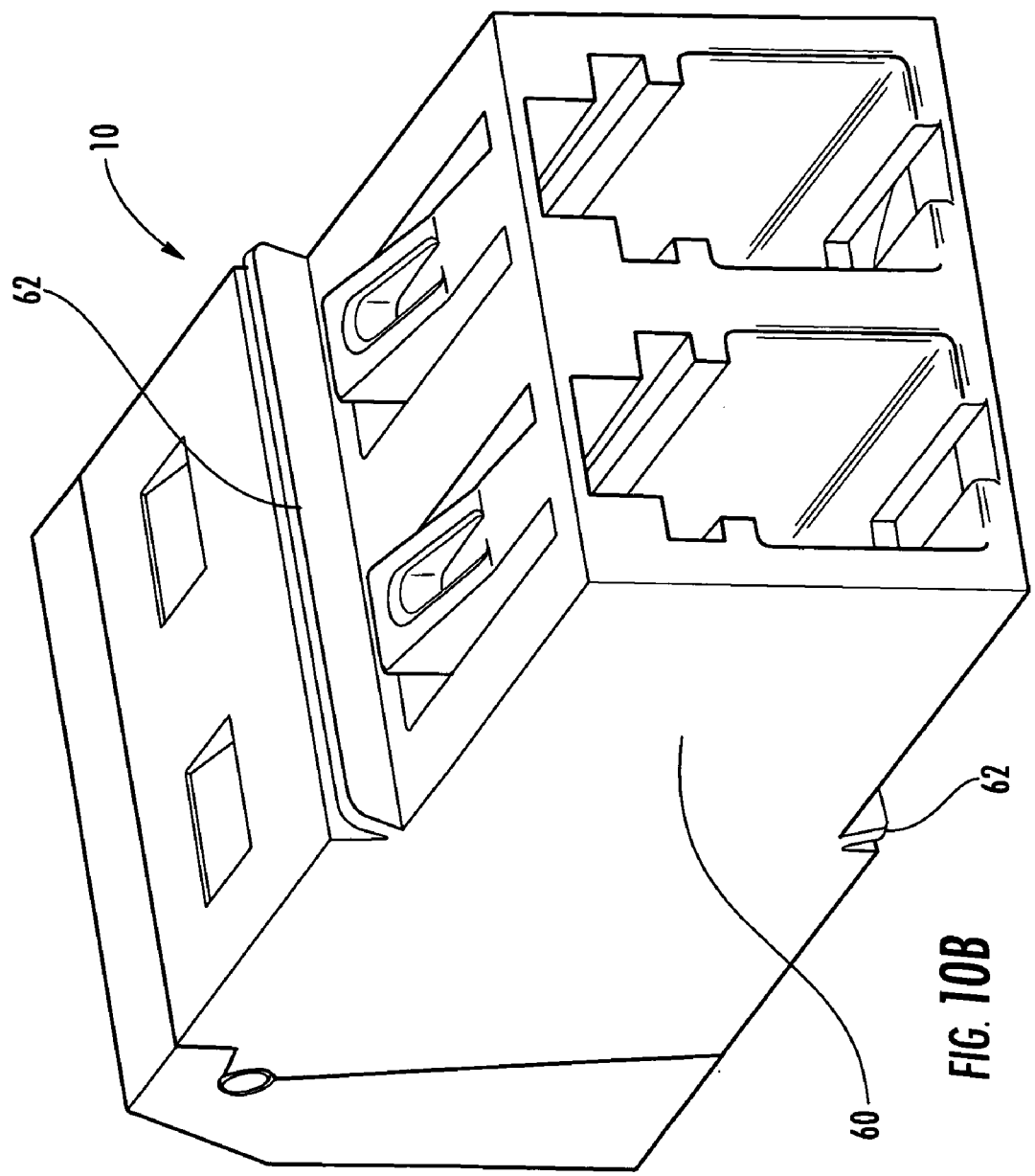
Figure 11:
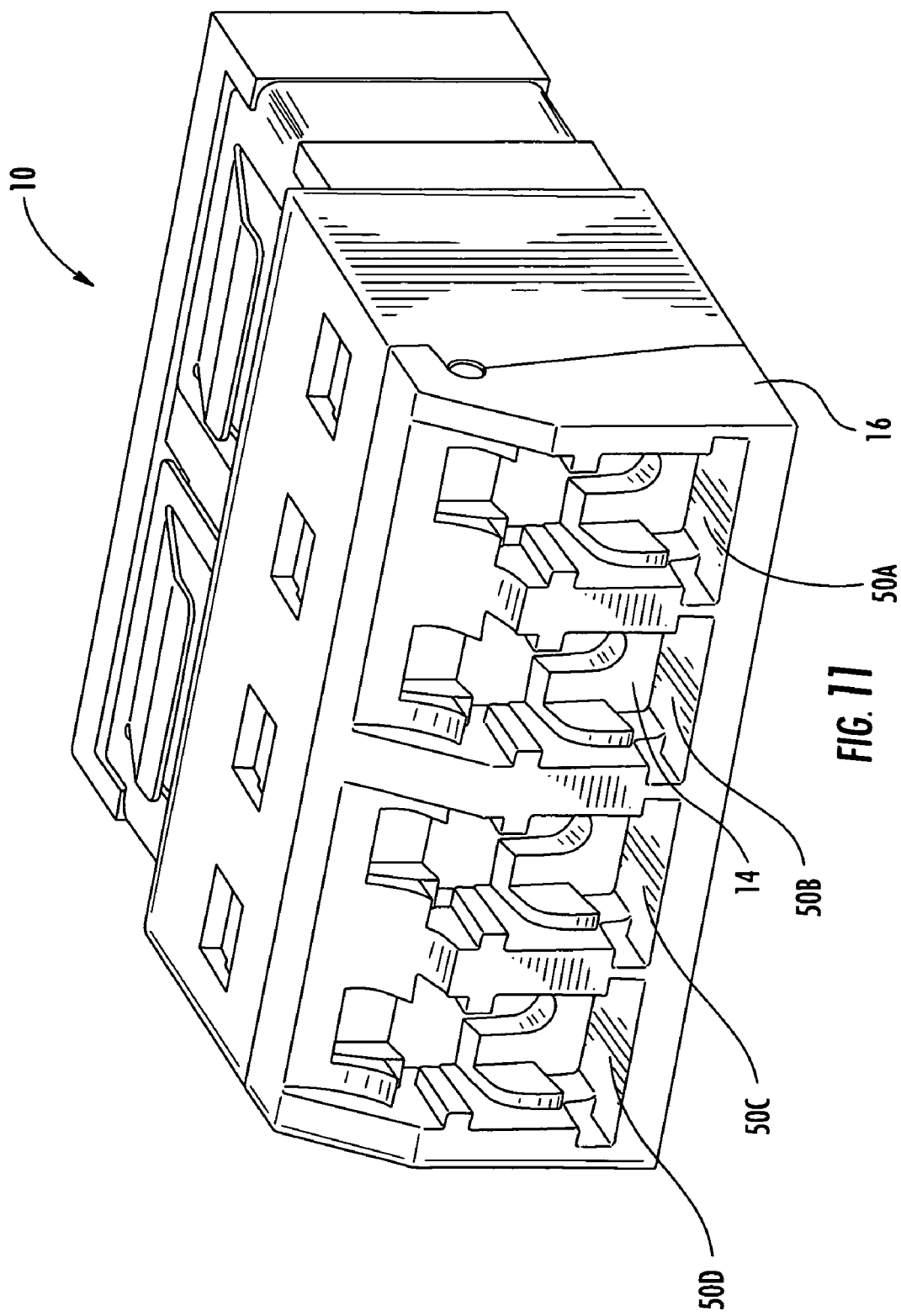
FIG. 11 is a perspective view of yet another embodiment of a fiber optic adapter according to certain aspects of the present invention.

In other embodiments of the present invention, body 12 can include one or more dampener features 62 (illustrated in FIGS. 10A and 10B) to inhibit rattling when the adapter 10 is mounted in a panel. For instance, a step (as shown in FIG. 10B) can be molded onto one or more retention tabs to engage the interior of a panel cutout and dampen the adapter 10 in the vertical direction or horizontal direction. As part of the dampener feature, a spring feature can be molded onto the flange to engage the panel and restrain the adapter 10 in the direction that the adapter 10 is inserted. In other embodiments, the dampener features 62 can include one or more D-shaped gaskets (as shown in FIG. 10A). The gasket(s) can have various cross-sections and can be made of several different flexible materials including elastomers and silicones. The gasket(s) can be attached to an adapter 10 via an adhesive, an overmolding process, or simply by an interface fit between cutouts on the adapter and the gasket. Gaskets can be utilized to restrain movement in both the horizontal and vertical direction.

The present invention is not limited to duplex adaptors. For example, turning to FIG. 11, a quad adapter 10 is illustrated. The quad adapter 10 functions in much the same way as that of the other adapters described herein. However, the alignment cap 16 defines four openings 50A, 50B, 50C, 50D at the first end allowing for four fiber optic connectors to be inserted into the openings 50A, 50B, 50C, 50D. As in the other illustrations, a single shutter door 14 includes hinges 42 that are configured to pivotally mount shutter 14 to pivot inwardly when contacted by a fiber optic connector. Still, it should be understood that separate shutter doors at each opening 50A, 50B, 50C, 50D are also contemplated by the present disclosure.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic adapter assembly, comprising:
    a body;
    an alignment cap, at least a portion of the alignment cap being in contact with a portion of the body, the alignment cap defining at least one opening configured for receiving a fiber optic connector through the at least one opening into the body, the alignment cap and the body together defining a space; and
    a shutter door, the shutter door pivotally disposed in the space defined by the body and the alignment cap in order to inhibit debris from entering through the at least one opening into the body, the shutter door configured to pivot inwardly when contacted by a fiber optic connector being inserted through the at least one opening into the body, the shutter door comprising at least one standoff and at least one latch, the at least one latch configured to engage and assist in retaining a fiber optic connector that is inserted through the at least one opening into the body.

2. The fiber optic adaptor assembly of claim 1, wherein the shutter door further defines a recessed area.

3. The fiber optic adaptor assembly of claim 1, wherein the shutter door further defines a first standoff and a second standoff with a recessed area disposed therebetween.

4. The fiber optic adapter assembly of claim 1, wherein the at least one opening is configured for receiving a fiber optic connector selected from the group of: an LC connector, an SC connector, and a multi-fiber connector.

5. The fiber optic adapter assembly of claim 4, wherein the translucent material comprises an invisible to visible light converting material.

6. The fiber optic adapter assembly of claim 1, wherein the shutter door further comprises a translucent material.

7. The fiber optic adapter assembly of claim 1, wherein the fiber optic adaptor assembly is selected from the group of: a duplex adaptor assembly with the alignment cap defining two openings, and a quad adaptor assembly with the alignment cap defining four openings.

8. The fiber optic adaptor assembly of claim 1, further comprising at least one spring, the at least one spring operable for biasing the shutter door to a closed position for inhibiting debris from entering through the at least one opening into the body.

9. The fiber optic adaptor assembly of claim 8, wherein the at least one spring comprises a torsion spring.

10. A fiber optic adapter assembly, comprising:
a body comprising a first end and a second end;
an alignment cap, at least a portion of the alignment cap being in contact with a portion of the first end of the body, the alignment cap defining at least one opening configured for receiving a fiber optic connector through the at least one opening into the first end of the body, the alignment cap and the first end of the body together defining a space; and
a shutter door comprising a translucent material, the shutter door pivotally disposed in the space defined by the first end of the body and the alignment cap in order to inhibit debris from entering through the at least one opening into the first end of the body, the shutter door configured to pivot inwardly when contacted by a fiber optic connector being inserted through the at least one opening into the first end of the body, the shutter door comprising at least one standoff and at least one latch, the at least one latch configured to engage and assist in retaining a fiber optic connector that is inserted through the at least one opening into the first end of the body.

11. The fiber optic adaptor assembly of claim 10, wherein the shutter door further defines a first standoff and a second standoff with a recessed area disposed therebetween.

12. The fiber optic adapter assembly of claim 10, wherein the translucent material comprises an invisible to visible light converting material.

13. The fiber optic adapter assembly of claim 10, further comprising:
a second alignment cap, at least a portion of the second alignment cap being in contact with a portion of the second end of the body, the second alignment cap defining at least one opening configured to receive a fiber optic connector through the at least one opening into the second end of the body, the second alignment cap and the second end of the body together defining a space; and
a second shutter door, the second shutter door pivotally disposed in the space defined by the second end of the body and the second alignment cap in order to prevent debris from entering through the at least one opening defined by the second alignment cap into the second end of the body, the second shutter door configured to pivot inwardly when contacted by a fiber optic connector being inserted through the at least one opening defined by the second alignment cap into the second end of the body, the second shutter door comprising at least one standoff and at least one latch, the at least one standoff configured to assist in preventing a ferrule of a fiber optic connector from contacting the second shutter door, the at least one latch configured to engage and assist in retaining a fiber optic connector that is inserted through the at least one opening defined by the second alignment cap into the second end of the body.

14. The fiber optic adapter assembly of claim 13, wherein the fiber optic adaptor assembly is selected from the group of a duplex adaptor assembly with the alignment cap and second alignment cap each defining two openings, and a quad adaptor assembly with the alignment cap and second alignment cap each defining four openings.

15. The fiber optic adapter assembly of claim 13, wherein the second shutter door further comprises a translucent material.

16. The fiber optic adapter assembly of claim 15, wherein the translucent material comprises an invisible to visible light converting material.

17. The fiber optic adaptor assembly of claim 13, wherein the second shutter door further defines a recessed area to assist in preventing a ferrule of a fiber optic connector from contacting the second shutter door.

18. The fiber optic adaptor assembly of claim 10, wherein the shutter door further defines a recessed area to assist in preventing a ferrule of a fiber optic connector from contacting the shutter door.

19. A fiber optic adapter assembly including a fiber optic connector and an fiber optic adapter, the fiber optic adapter comprising:
a body;
an alignment cap, at least a portion of the alignment cap being in contact with a portion of the body, the alignment cap defining at least one opening configured to receive the fiber optic connector through the at least one opening into the body, the alignment cap and the body together defining a space; and
a shutter door, the shutter door pivotally disposed in the space defined by the body and the alignment cap in order to inhibit debris from entering through the at least one opening into the body, the shutter door configured to pivot inwardly when contacted by the fiber optic connector being inserted through the at least one opening into the body, the shutter door comprising at least one standoff and at least one latch, the at least one latch configured to engage and assist in retaining the fiber optic connector that is inserted through the at least one opening into the body.

20. The assembly of claim 19, wherein the fiber optic connector is selected from the group of: an LC connector, an SC connector, and a multi-fiber connector.

21. The assembly of claim 19, wherein the shutter door further comprises a translucent material.

22. The assembly of claim 19, wherein the translucent material comprises an invisible to visible light converting material.

* * * * *